J. E. BRANNON & W. A. GOSHEN.
NUT LOCK.
APPLICATION FILED JUNE 24, 1912.
1,055,867.
Patented Mar. 11, 1913.
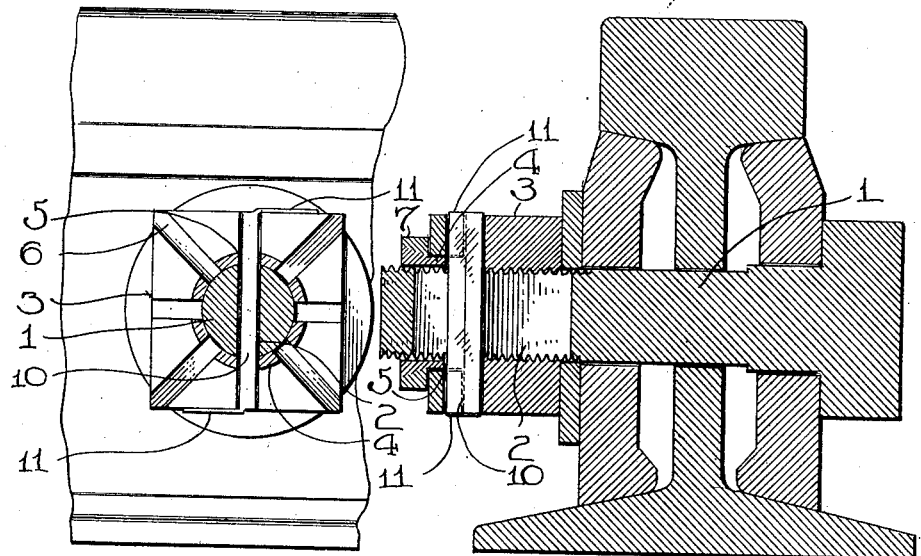
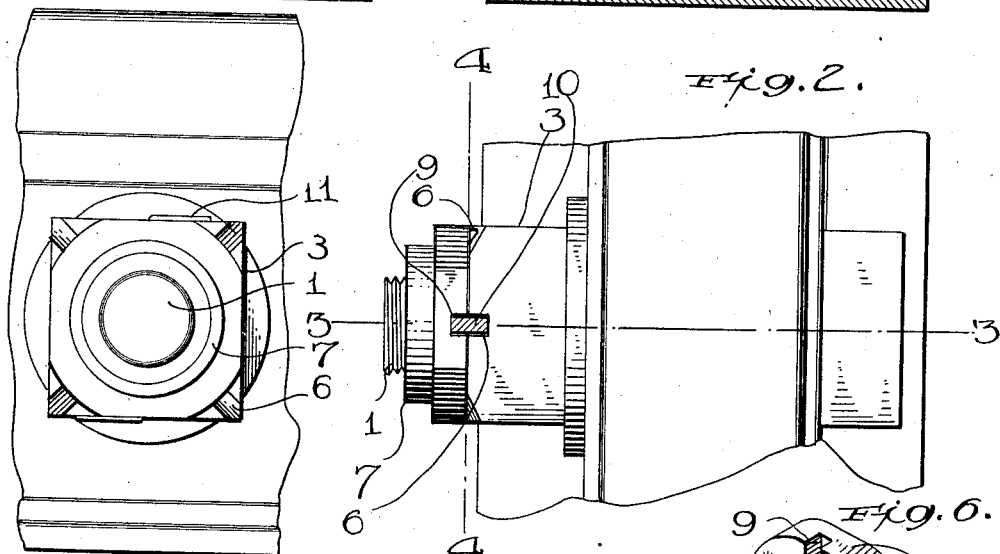
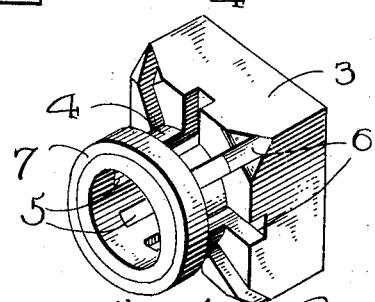
WITNESSES
INVENTORS
John E. Brannon
William A. Goshen
By E. E. Vrooman, their Attorney.

UNITED STATES PATENT OFFICE.

JOHN EMRY BRANNON AND WILLIAM ALEXANDER GOSHEN, OF FONTANET, INDIANA.

NUT-LOCK.

1,055,867.     Specification of Letters Patent.     Patented Mar. 11, 1913.

Application filed June 24, 1912. Serial No. 705,596.

*To all whom it may concern:*

Be it known that we, JOHN E. BRANNON and WILLIAM A. GOSHEN, citizens of the United States, residing at Fontanet, in the county of Vigo and State of Indiana, have invented certain new and useful Improvements in Nut-Locks, of which the following is a specification, reference being had therein to the accompanying drawing.

This invention relates to nut locks and has for its object the production of an efficient means for firmly holding the nut in a locked position upon the bolt after the same has been mounted thereon.

Another object of this invention is the production of an efficient means for preventing the nut from rotating upon the bolt.

With these and other objects in view this invention consists in certain novel combinations, constructions and arrangement of parts as will be hereinafter fully described and claimed.

In the accompanying drawings: Figure 1 is a fragmentary side elevation of the rail showing an end view of the nut locked upon the bolt. Fig. 2 is a top plan view of the nut in a locked position. Fig. 3 is a section taken on line 3—3, of Fig. 2. Fig. 4 is a section taken on line 4—4, of Fig. 2. Fig. 5 is a perspective view of the improved nut. Fig. 6 is a perspective of the retaining washer which is used in connection with the nut.

Referring to the accompanying drawings by numerals 1 indicates an ordinary bolt which is provided with a longitudinally extending slot 2 which terminates at a spaced distance from the end of the bolt. The nut 3 which is used in connection with the bolt is provided with an annular projecting shank 4. This shank 4 is formed integral with the nut 3 and is provided with a plurality of longitudinally extending slots 5, said slots 5 registering with the notches 6 formed upon the nut 3. A retaining band 7 is welded upon the outer end of the shank 4 and forms a means for holding the retaining washer 8 upon the shank 4. This retaining washer 8 is provided with a pair of transversely extending notches 9 which are so formed as to register with the notches 6 formed upon the nut 3.

After the nut has been threaded upon the bolt, it is held in a locked position by means of the pin 10, which is formed of a comparatively thickened body portion and a pair of comparatively thin arms 11 extending from said body portion. The retaining washer 8 is provided with a plurality of flattened sides 12 which are adapted to form an even surface with the sides of the nut 3 when the retaining washer is positioned upon the shank 4. It will be seen that by use of these flattened sides 12 that the arms 11 of the pin 10 will lie flatly upon the nut and retaining washer.

After the nut has been threaded upon the bolt, and the pin 10 passed through the slots 5 and the slot 2 formed in the bolt 1, the strain upon the shank 4 is greatly reduced for the reason that the body portion of the pin passes through the bolt and rests within the notches 9 formed in the retaining washer 8. The strain upon the retaining washer 8 will in turn be imparted to the nut 3, since a portion of the pin rests within the notches 6 of the nut 3. It will be seen that by use of the pin 10 which is provided with the comparatively thin arm 11, any transverse movement of said pin relative to said nut will be prevented by the arms 11 resting upon the surface of the nut 3.

Having thus described the invention what is claimed as new, is:—

1. In a nut lock of the class described, the combination with a bolt, said bolt provided with a longitudinally extending slot near its outer end, a nut threaded upon said bolt, said nut provided with a projecting shank, a retaining band welded upon the outer end of said shank, said shank provided with a plurality of longitudinally extending slots, said nut provided with a plurality of notches formed upon its outer face, said notches and said longitudinally extending slots registering with each other, a retaining washer carried by said shank and held thereon by means of said retaining band, said retaining washer provided with a pair of transversely extending notches, said notches formed upon said retaining washer registering with the notches formed upon said nut and longitudinally extending slots formed upon said shank, and means passing through said nut and washer and said bolt for locking said nut upon said bolt.

2. In a nut lock of the class described, the combination with a bolt, said bolt provided with a longitudinally extending slot near its outer end, a nut threaded upon said bolt, said nut provided with an integral formed projecting shank, a retaining band carried by the outer end of said shank, said shank provided with a plurality of longitudinally extending slots, said nut provided with a plurality of notches upon its outer face, a retaining washer carried by said shank and held thereon by means of said retaining band, said washer provided with a pair of transversely extending notches, the notches formed upon said retaining washer and the notches formed upon said nut registering with each other and with the longitudinally extending slots formed in said projecting shank, a pin passing through said notches and said longitudinally extending slots and said bolt for locking said nut upon said bolt, said pin comprising a comparatively thickened body portion, a plurality of comparatively thin arms carried by the ends of said pin, said nut provided with a plurality of flattened outer faces which are so formed as to constitute an even surface with said nut, the arms of said pin adapted to be bent so as to lie flatly upon the even surface of said nut and said retaining washer for preventing the transverse movement of said pin relative to said nut.

In testimony whereof we hereunto affix our signatures in presence of two witnesses.

JOHN EMRY BRANNON.
WILLIAM ALEXANDER GOSHEN.

Witnesses:
CHAS. W. McNIEL,
W. P. BOATMAN.

---

Copies of this patent may be obtained for five cents each, by addressing the "Commissioner of Patents, Washington, D. C."